United States Patent
Nakagawa (10) Patent No.: US 11,618,424 B2
(45) Date of Patent: Apr. 4, 2023

(54) VEHICLE BRAKING APPARATUS, VEHICLE BRAKING METHOD, AND VEHICLE BRAKING SYSTEM

(71) Applicant: Hitachi Automotive Systems, Ltd., Hitachinaka (JP)

(72) Inventor: Satoshi Nakagawa, Hadano (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 616 days.

(21) Appl. No.: 16/629,207

(22) PCT Filed: Jul. 4, 2018

(86) PCT No.: PCT/JP2018/025310
§ 371 (c)(1),
(2) Date: Jan. 7, 2020

(87) PCT Pub. No.: WO2019/017202
PCT Pub. Date: Jan. 24, 2019

(65) Prior Publication Data
US 2021/0086740 A1 Mar. 25, 2021

(30) Foreign Application Priority Data
Jul. 21, 2017 (JP) ............................. JP2017-141451

(51) Int. Cl.
*B60T 13/68* (2006.01)
*B60T 13/66* (2006.01)
(Continued)

(52) U.S. Cl.
CPC .......... *B60T 13/686* (2013.01); *B60T 13/662* (2013.01); *B60T 7/042* (2013.01); *B60T 8/4081* (2013.01);
(Continued)

(58) Field of Classification Search
CPC ...... B60T 13/74; B60T 13/745; B60T 8/1766; B60T 8/26; B60T 8/4013; B60T 2201/03;
(Continued)

(56) References Cited

U.S. PATENT DOCUMENTS 8,152,245 B2 * 4/2012 Lubbers ................ B60T 13/586
303/151
2011/0248558 A1 * 10/2011 Vollert ..................... B60T 1/10
303/3

(Continued)

FOREIGN PATENT DOCUMENTS

JP 4-136338 U 12/1992
JP 2006-29442 A 2/2006
(Continued)

OTHER PUBLICATIONS

International Search Report (PCT/ISA/210) issued in PCT Application No. PCT/JP2018/025310 dated Oct. 2, 2018 with English translation (five (5) pages).
(Continued)

*Primary Examiner* — Bradley T King
(74) *Attorney, Agent, or Firm* — Crowell & Moring LLP (57) ABSTRACT

Provided are a vehicle braking apparatus, a vehicle braking method, and a vehicle braking system, which improve the responsiveness of a braking force of a vehicle. The vehicle braking apparatus includes a braking torque generating mechanism configured to generate a braking torque in a first braking torque imparting portion that imparts a braking torque to a first wheel portion comprising either front or rear wheels of the vehicle and a second braking torque imparting portion that imparts a braking torque in a second wheel portion comprising the other ones of the front and rear wheels. The vehicle braking apparatus further includes a control mechanism configured to output to the braking torque generating mechanism a command for generating the (Continued)

braking force precedentially in the second wheel portion selected according to a condition of a vehicle as a wheel portion in which the braking force should be precedentially generated.

7 Claims, 4 Drawing Sheets

(51) Int. Cl.
*B60T 7/04* (2006.01)
*B60T 8/40* (2006.01)

(52) U.S. Cl.
CPC ..... *B60T 2270/604* (2013.01); *B60Y 2400/81* (2013.01)

(58) Field of Classification Search
CPC .... B60T 13/686; B60T 13/662; B60T 8/4081; B60T 7/042; B60T 2270/604; B60Y 2400/81
See application file for complete search history.

(56) References Cited

U.S. PATENT DOCUMENTS

| | | | |
|---|---|---|---|
| 2013/0197771 A1* | 8/2013 | Takeda | B60T 13/745 701/70 |
| 2016/0082937 A1 | 3/2016 | Nakaoka et al. | |
| 2017/0015290 A1* | 1/2017 | Oosawa | B60T 13/146 |
| 2017/0361825 A1* | 12/2017 | Drumm | B60T 8/4081 |
| 2018/0079313 A1* | 3/2018 | Foitzik | B60T 13/741 |
| 2018/0162332 A1 | 6/2018 | Nakazawa et al. | |
| 2018/0297574 A1* | 10/2018 | Zimmermann | B60T 8/4081 |
| 2019/0031165 A1* | 1/2019 | Besier | B60T 13/686 |
| 2019/0184958 A1* | 6/2019 | Watanabe | B60T 13/686 |
| 2019/0344769 A1* | 11/2019 | Zimmermann | B60T 8/326 |
| 2020/0114894 A1* | 4/2020 | Leiber | B60T 13/745 |
| 2020/0139949 A1* | 5/2020 | Dolmaya | B60T 8/4081 |

FOREIGN PATENT DOCUMENTS

| | | |
|---|---|---|
| JP | 2016/190584 A | 11/2016 |
| WO | WO 2014/184840 A1 | 11/2014 |
| WO | WO 2016/208303 A1 | 12/2016 |

OTHER PUBLICATIONS

Japanese-language Written Opinion (PCT/ISA/237) issued in PCT Application No. PCT/JP2018/025310 dated Oct. 2, 2018 with English translation (18 pages).

* cited by examiner

VEHICLE BRAKING APPARATUS, VEHICLE BRAKING METHOD, AND VEHICLE BRAKING SYSTEM

TECHNICAL FIELD

The invention relates to a vehicle braking apparatus, a vehicle braking method, and a vehicle braking system.

BACKGROUND ART

Patent Literature 1 discloses a vehicle braking apparatus with redundancy for an actuator that imparts braking torque to wheels.

CITATION LIST

Patent Literature

PTL 1: WO 2014/184840

SUMMARY OF INVENTION

Technical Problem

The Patent Literature 1 does not at all disclose the responsiveness of the vehicle braking force, and the conventional vehicle braking apparatus described in the Patent Literature 1 has the problem that a braking force response might be delayed when a rapid deceleration is required.

An object of the invention is to provide a vehicle braking apparatus, a vehicle braking method, and a vehicle braking system which improve responsiveness of a braking force of a vehicle.

Solution to Problem

A vehicle braking apparatus according to one embodiment of the invention comprises a braking torque generating mechanism configured to generate a braking torque in a first braking torque imparting portion that imparts a braking torque to a first wheel portion comprising either front or rear wheels of a vehicle and a second braking torque imparting portion that imparts a braking torque to a second wheel portion comprising the other ones of the front and rear wheels. The vehicle braking apparatus further comprises a control mechanism configured to output to the braking torque generating mechanism a command for generating the braking force precedentially in the second wheel portion that is selected according to a condition of a vehicle as a wheel portion in which the braking force should be precedentially generated.

The invention thus improves responsiveness of a vehicle braking force.

DESCRIPTION OF EMBODIMENTS

Embodiment 1

Figure 1:
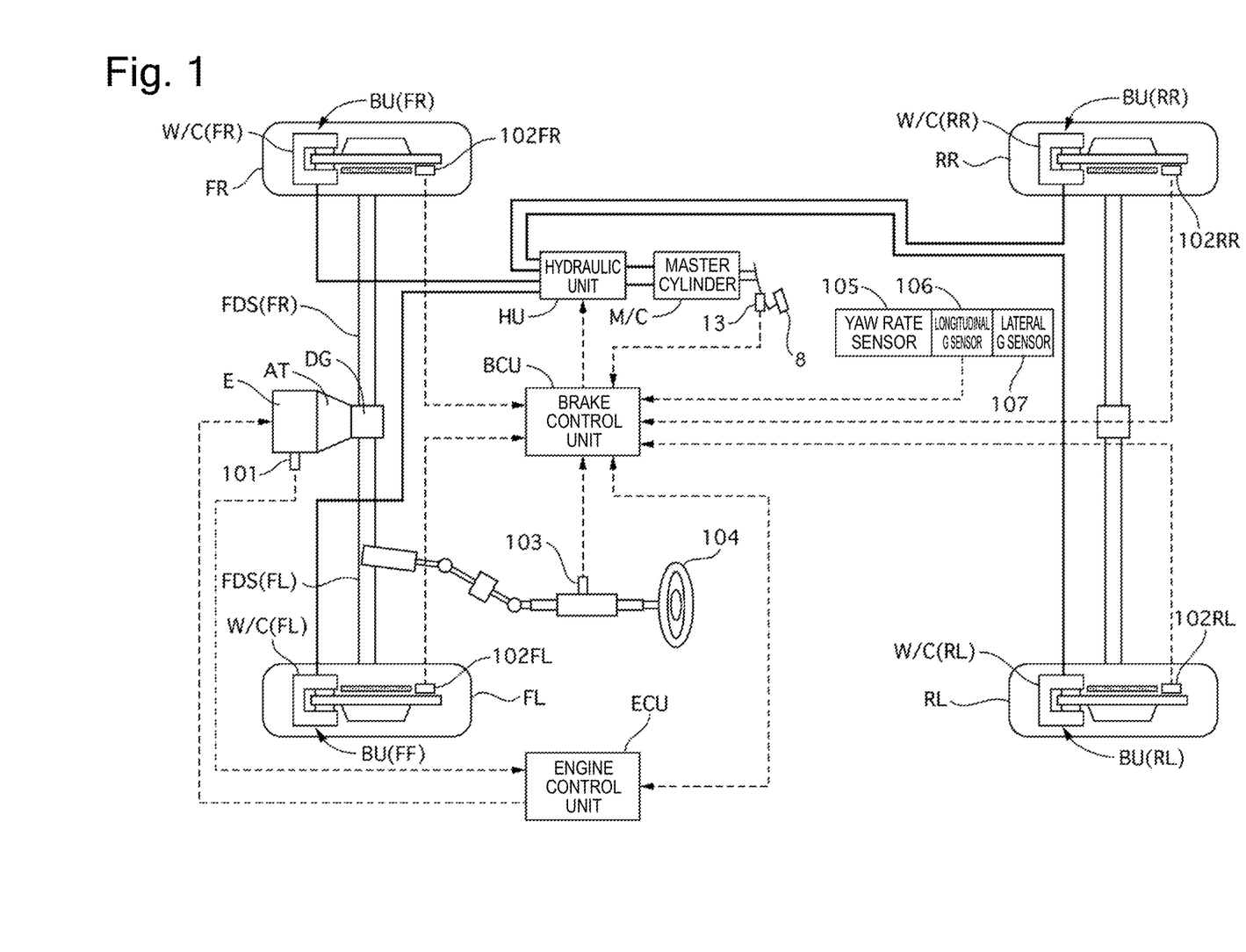
FIG. 1 is a configuration diagram of a vehicle braking apparatus of an Embodiment 1.

FIG. 1 is a configuration diagram of a vehicle braking apparatus of an Embodiment 1.

The vehicle braking apparatus of the Embodiment 1 is installed in an engine vehicle. The vehicle braking apparatus imparts a frictional braking torque generated by hydraulic pressure to wheels (a front left wheel FL, a front right wheel FR, a rear left wheel RL, and a rear right wheel RR) of the vehicle. The wheels FL, FR, RL and RR are each provided with a brake actuation unit BU. The brake actuation unit BU is a braking torque imparting portion that includes a wheel cylinder W/C. The brake actuation unit BU is, for example, of a disc type and includes a caliper (hydraulic brake caliper). The caliper includes a brake disc and a brake pad. The brake disc is a brake rotor that rotates integrally with a tire. The brake pad is spaced away from the brake disc with a predetermined clearance left therebetween and moved by the hydraulic pressure of the wheel cylinder W/C into contact with the brake disc. The brake pad's contact with the brake disc generates the frictional braking torque.

An engine E is coupled to front drive shafts FDS (FL) and FDS (FR) of the front left and right wheels FL and FR via an automatic transmission AT and a differential gear DG. The engine E imparts a driving force to the front left and right wheels FL and FR on the basis of a command from an engine control unit ECU.

The engine control unit ECU controls a fuel injection amount and ignition timing of the engine E on the basis of driving conditions including engine revolving speed from an engine revolving speed sensor 101, intake air mass, coolant temperature, a throttle valve position (throttle position), and other like conditions.

A brake control unit (control mechanism) BCU sends a command to a hydraulic unit HU on the basis of a pedal stroke from a stroke sensor 13, wheel speeds from wheel speed sensors 102FL, 102FR, 102RL and 102RR provided in the wheels FL, FR, RL and RR, a steering angle of a steering wheel 104 from a steering angle sensor 103, a yaw rate from a yaw rate sensor 105, a longitudinal acceleration rate from a longitudinal G sensor 106, a lateral acceleration rate from a lateral G sensor 107, and other similar devices. The hydraulic unit HU is a braking torque generating mechanism that controls hydraulic brake pressure (wheel cylinder hydraulic pressure) of each of the wheel cylinder W/C and thus causes the brake actuation unit BU to generate a braking torque. The hydraulic unit HU increases/decreases or maintains the wheel cylinder hydraulic pressure of the brake actuation unit BU according to the command from the brake control unit BCU.

Figure 2:
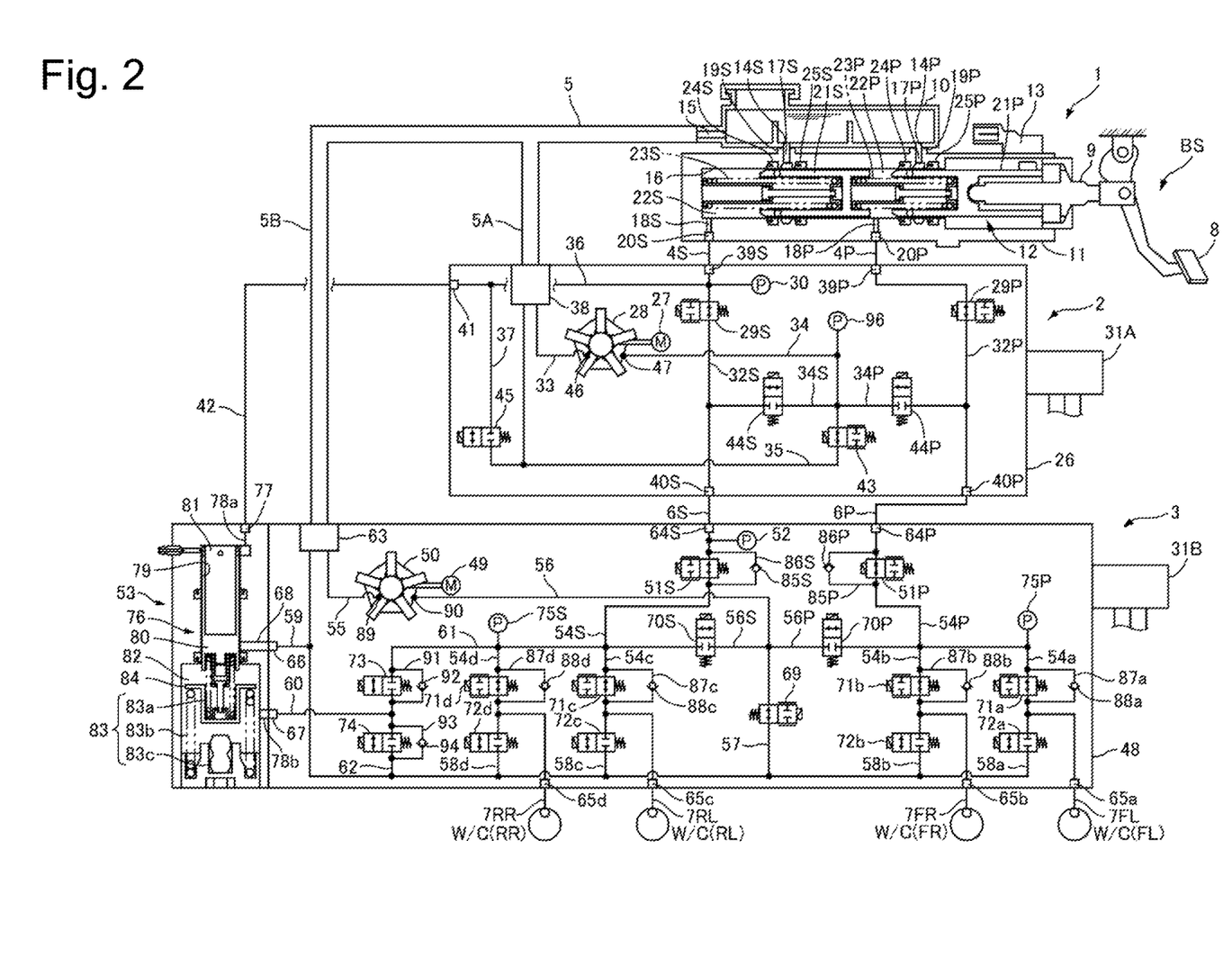
FIG. 2 is a configuration diagram of a vehicle braking system BS according to the Embodiment 1.

FIG. 2 is a configuration diagram of a vehicle braking system BS according to the Embodiment 1.

The vehicle braking system BS includes brake pipes of a dual system (primary and secondary systems). The brake wiring of the vehicle braking system BS is so-called H pluming in which the primary system is connected to the brake actuation units BU of the front wheels FL and FR and in which the secondary system is connected to the brake actuation units BU of the rear wheels RL and RR. Hereinafter, when a distinction has to be made between members corresponding to the primary system (P system) and those corresponding to the secondary system (S system), the members are provided with indexes P and S at the end of their reference marks. The vehicle braking system BS supplies brake fluid to the wheel cylinders W/C through the brake pipes.

The vehicle braking system BS includes a master cylinder unit 1, a first hydraulic unit 2, and a second hydraulic unit 3. The first hydraulic unit 2 and the second hydraulic unit 3 make up the hydraulic unit HU. The master cylinder unit 1 and the first hydraulic unit 2 are connected to each other through a first primary pipe 4P, a first secondary pipe 4S, a reservoir pipe 5, and a reservoir pipe 5A for the first hydraulic unit 2, which branches from the reservoir pipe 5. The master cylinder unit 1 and the second hydraulic unit 3 are connected to each other through the reservoir pipe 5 and a reservoir pipe 5B for the second hydraulic unit 3, which branches from the reservoir pipe 5. The reservoir pipes 5A and 5B may be connected directly to the master cylinder unit 1 without dividing the reservoir pipe 5. The first hydraulic unit 2 and the second hydraulic unit 3 are connected to each other through a second primary pipe 6P and a second secondary pipe 6S. The second hydraulic unit 3 is connected to the wheel cylinders W/C (FL and FR) of the front wheels FL and FR through wheel cylinder pipes 7FL and 7FR, respectively. The second hydraulic unit 3 is connected to the wheel cylinders W/C (RL and RR) of the rear wheels RL and RR through wheel cylinder pipes 7RL and 7RR, respectively.

The master cylinder unit 1 includes a brake pedal 8, an input rod 9, a reservoir tank 10, a master cylinder housing 11, a master cylinder 12, and a stroke sensor 13. The master cylinder unit 1 does not have a booster that boosts a brake operation force using engine negative intake pressure or the like. The brake pedal 8 receives an input of the brake operation force applied by the driver. The input rod 9 is connected to the brake pedal 8. The reservoir tank 10 retains the brake fluid at atmospheric pressure. The reservoir tank 10 has a resupply port 14 and a supply port 15. The supply port 15 is connected to the reservoir pipe 5. The master cylinder housing 11 is a housing that accommodates (incorporates) the master cylinder 12 inside. The master cylinder housing 11 is provided inside with a cylinder 16 for the master cylinder 12, a resupply fluid path 17, and a supply fluid path 18. The resupply fluid path 17 is connected to the cylinder 16 at one end. The other end of the resupply fluid path 17 is connected to a resupply port 19 that opens in an outer surface of the master cylinder housing 11. The resupply port 19 is connected to a resupply port 14 of the reservoir tank 10. The supply fluid path 18 is connected to the cylinder 16 at one end. The other end of the supply fluid path 18 is connected to a supply port 20 that opens in the outer surface of the master cylinder housing 11. A supply port 20P is connected to the primary pipe 4P. A supply port 20S is connected to the secondary pipe 4S.

The master cylinder 12 is connected to the brake pedal 8 through the input rod 9 and generates a master cylinder hydraulic pressure according to the driver's operation of the brake pedal 8. The master cylinder 12 includes a piston 21 displaced in an axial direction according to the operation of the brake pedal 8. The piston 21 is located inside the cylinder 16 and defines a hydraulic chamber 22. The master cylinder 12 is of a tandem type and includes, as the piston 21, a primary piston 21P against which the input rod 9 pushes and a secondary piston 21S of a free piston type. The pistons 21P and 21S are arranged in series. The pistons 21P and 21S define a primary chamber 22P inside the cylinder 16. The secondary piston 21S defines a secondary chamber 22S inside the cylinder 16. The hydraulic chambers 22P and 22S are resupplied with the brake fluid from the reservoir tank 10 and generate the master cylinder hydraulic pressure by displacement of the piston 21. The primary chamber 22P contains a coil spring 23P as a return spring. The coil spring 23P is interposed between the pistons 21P and 21S. The secondary chamber 22S contains a coil spring 23S as a return spring. The coil spring 23S is interposed between a bottom portion of the cylinder 16 and the piston 21S. Piston seals 24 and 25 are disposed in an inner periphery of the cylinder 16. The piston seals 24 and 25 are a plurality of seal members that comes into sliding contact with the pistons 21P and 21S to seal a gap between outer peripheral surfaces of the pistons 21P and 21S on one hand and an inner peripheral surface of the cylinder 16 on the other. The piston seals are publicly-known seal members (cup seals) each having a cup-like cross-section provided with a lip portion at an inner diameter side. When the lip portion is in contact with the outer peripheral surface of the piston 21, the seal member allows the brake fluid to flow in one direction and prevents the brake fluid to flow in the other direction. The first piston seal 24 allows the brake fluid to flow from the resupply port 14 toward the primary chamber 22P and the secondary chamber 22S and prevents the brake fluid to flow in an opposite direction. The second piston seal 25 allows the brake fluid to flow toward the resupply port 14 and prevents the brake fluid to flow out of the resupply port 14. The stroke sensor 13 detects a displacement amount (pedal stroke amount) of the primary piston 21P.

The first hydraulic unit 2 includes a first hydraulic unit housing 26, a first motor 27, a first pump 28, a plurality of electromagnetic valves 29 or the like, a plurality of hydraulic sensors 30 or the like, and a first control unit 31A. The control unit 31A and a control unit 31B mentioned later make up the brake control unit BCU. The first hydraulic unit housing 26 is a housing that accommodates (incorporates) the first pump 28 and valve elements such as the electromagnetic valves 29. The first hydraulic unit housing 26 is provided inside with a circuit of the dual system (P and S systems) through which the brake fluid circulates. The circuit of the dual system includes a plurality of fluid paths. The plurality of fluid paths include a first connection fluid path 32, a first suction fluid path 33, a first discharge fluid path 34, a first reflux fluid path 35, a positive pressure fluid path 36, and a positive pressure-side second communicating path 37. The first hydraulic unit housing 26 includes a plurality of ports and an inner reservoir 38. The plurality of ports are a first input port 39, a first output port 40, and a positive pressure port 41. A first input port 39P is connected to the first primary pipe 4P. A first input port 39S is connected to the first secondary pipe 4S. A first output port 40P is connected to the second primary pipe 6P. A first output port 40S is connected to the second secondary pipe 6S. The positive pressure port 41 is connected to a positive pressure pipe 42. The inner reservoir 38 is a tank that is capable of retaining the brake fluid. The inner reservoir 38 is connected to the reservoir pipe 5A.

The first pump 28 sucks and discharges the brake fluid contained in the reservoir tank 10. The first pump 28 is a plunger pump with five plungers having, for example, excellent noise and vibration damping properties and the like. The first motor 27 drives the first pump 28. The plurality of electromagnetic valves 29 or the like are solenoid valves that act according to a control signal. The plurality of electromagnetic valves 29 or the like are valve elements that stroke according to energization of the solenoids and switch the opening and closing of the fluid paths (connect and disconnect the fluid paths). The plurality of electromagnetic valves 29 or the like control a communication condition of the circuit and adjust a circulation condition of the brake fluid, to thereby generate control hydraulic pressure. The plurality of electromagnetic valves 29 or the like comprise a first cutoff valve 29, a first pressure adjustment valve 43, a first connection valve 44, and a stroke valve 45. The first cutoff valve 29 and the first pressure adjustment valve 43 are proportional control valves of a normally-open type which open in a non-energized state. The first connection valve 44 is an on-off valve of a normally-closed type which is closed in a non-energized state. The stroke valve 45 is an on-off valve of a normally-open type which is closed in a non-energized state. In FIG. 1, the plurality of electromagnetic valves 29 or the like are in the non-energized state. The plurality of hydraulic sensors 30 or the like are a first master cylinder hydraulic sensor 30 and a first discharge pressure sensor 96.

The control unit 31A directly receives detection signals of the stroke sensor 13, the first master cylinder hydraulic sensor 30, and the first discharge pressure sensor 96. The first control unit 31A receives a detection signal of a wheel cylinder hydraulic sensor 75 via the second control unit 31B and also receives information of vehicle speed and the like through a CAN bus line, not shown. The first control unit 31A and the second control unit 31B communicate with each other through a communication wire (or a CAN bus line). The first control unit 31A controls the opening/closing of the plurality of electromagnetic valves 29 or the like installed in the first hydraulic unit housing 26 and a rotational frequency of the first motor 27 (that is, a discharge flow rate of the first pump 28) using the received signals and information on the basis of a stored program.

A brake hydraulic circuit of the first hydraulic unit 2 is discussed below.

The first connection fluid path 32 is connected to the first input port 39 at one end. The other end of the first connection fluid path 32 is connected to the first output port 40. The first connection fluid path 32 is provided with the first cutoff valve 29. The first master cylinder hydraulic sensor 30 is disposed in a first connection fluid path 32S at a position closer to the first input port 39S than to a first cutoff valve 29S. One end of the positive pressure fluid path 36 is also connected to the first connection fluid path 32S at the foregoing position. The other end of the positive pressure fluid path 36 is connected to the positive pressure port 41. The first master cylinder hydraulic sensor 30 detects a master cylinder hydraulic pressure. The first suction fluid path 33 is connected to the inner reservoir 38 at one end. The other end of the first suction fluid path 33 is connected to a first suction port 46 of the first pump 28. The first discharge fluid path 34 is connected to a first discharge port 47 of the first pump 28 at one end. The other end of the first discharge fluid path 34 diverges into a discharge fluid path 34P of the P system and a discharge fluid path 34S of the S system. The first discharge pressure sensor 96 is disposed in the first discharge fluid path 34. The first discharge pressure sensor 96 detects a discharge pressure of the first pump 28. The discharge fluid paths 34P and 34S are connected to the first connection fluid path 32 at positions closer to the first output port 40 than to the first cutoff valve 29. First connection valves 44P and 44S are disposed in the discharge fluid paths 34P and 34S, respectively. The first reflux fluid path 35 is connected to the inner reservoir 38 at one end. The other end of the first reflux fluid path 35 is connected to a connecting position at which the first discharge fluid path 34 is connected to the discharge fluid paths 34P and 34S. The first pressure adjustment valve 43 is disposed in the first reflux fluid path 35. The positive pressure-side second communicating path 37 is connected to the positive pressure fluid path 36 at one end. The other end of the positive pressure-side second communicating path 37 is connected to the first reflux fluid path 35. The stroke valve 45 is disposed in the positive pressure-side second communicating path 37.

The second hydraulic unit 3 includes a second hydraulic unit housing 48, a second motor 49, a second pump 50, a plurality of electromagnetic valves 51 or the like, a plurality of hydraulic sensors 52 or the like, a stroke simulator unit 53, and the second control unit 31B. Hereinafter, when a distinction has to be made among members corresponding to the wheels FL, FR, RL and RR, the members are provided with indexes a, b, c and d, respectively, at the end of their reference marks. The second hydraulic unit housing 48 is a housing that accommodates (incorporates) the second pump 50 and the valve elements such as the plurality of electromagnetic valves 51 or the like. The second hydraulic unit housing 48 contains the dual system (P and S systems) circuit through which the brake fluid circulates. The dual system circuit includes a plurality of fluid paths. The plurality of fluid paths comprise a second connection fluid path 54, a second suction fluid path 55, a second discharge fluid path 56, a second reflux fluid path 57, a pressure reduction fluid path 58, a resupply fluid path 59, a back pressure fluid path 60, a first simulator fluid path 61, and a second simulator fluid path 62. The second hydraulic unit housing 48 includes a plurality of ports and an inner reservoir 63. The plurality of ports comprise a second input port 64, a second output port 6S, a resupply port 66, and a back pressure port 67. A second input port 64P is connected to the second primary pipe 6P. A second input port 64S is connected to the second secondary pipe 6S. The second output port 65 is connected to the wheel cylinder W/C. The resupply port 66 is connected to a resupply fluid path 68 of a stroke simulator 76. The back pressure port 67 is connected to a back pressure fluid path 78b of the stroke simulator 76. The inner reservoir 63 is a tank that is capable of retaining the brake fluid. The inner reservoir 63 is connected to the reservoir pipe 5B.

The second pump 50 sucks and discharges the brake fluid contained in the reservoir tank 10. The second pump 50 is a plunger pump having a higher ability to discharge the brake fluid than the first pump 28. The second motor 49 drives the second pump 50. The plurality of electromagnetic valves 51 or the like are solenoid valves that act according to a control signal. The plurality of electromagnetic valves 51 or the like include valve elements that stroke according to energization of the solenoids and switch the opening/closing of the fluid paths. The plurality of electromagnetic valves 51 or the like control a communication condition of the circuit and adjust a circulation condition of the brake fluid, to thereby generate control hydraulic pressure. The plurality of electromagnetic valves 51 or the like comprise a second cutoff valve 51, a second pressure adjustment valve 69, a second connection valve 70, a solenoid in valve 71, a solenoid out valve 72, a stroke simulator in valve 73, and a stroke simulator out valve (stroke simulator valve) 74. The second cutoff valve 51, the second pressure adjustment valve 69, and the solenoid in valve 71 are proportional control valves of a normally-open type which open in a non-energized state. The second connection valve 70, the solenoid out valve 72, the stroke simulator in valve 73, and the stroke simulator out valve 74 are on-off valves of a normally-closed type which are closed in a non-energized state. In FIG. 1, the plurality of electromagnetic valves 51 or the like are in the non-energized state.

The plurality of hydraulic sensors 52 or the like comprise a second master cylinder hydraulic sensor 52 and the wheel cylinder hydraulic sensor 75.

The second control unit 31B directly receives detection signals of the stroke sensor 13, the second master cylinder hydraulic sensor 52, and the wheel cylinder hydraulic sensor 75. The second control unit 31B receives information including vehicle speed and the like through a CAN bus line, not shown. The second control unit 31B controls the opening/closing of the plurality of electromagnetic valves 51 or the like installed in the second hydraulic unit housing 48 and a rotational frequency of the second motor 49 (that is, a discharge flow rate of the second pump 50) using the received signals and information on the basis of a stored program.

The stroke simulator unit 53 is fixed to the second hydraulic unit housing 48. The stroke simulator unit 53 includes the stroke simulator 76, a positive pressure port 77, a positive pressure fluid path 78a, the resupply fluid path 68, and the back pressure fluid path 78b. The stroke simulator 76 imparts a reaction force and a stroke to the brake pedal 8 according to the driver's braking operation. The stroke simulator 76 includes a cylinder 79, a piston 80, a positive pressure chamber 81, a back pressure chamber 82, and an elastic body 83 (a first spring 83a, a second spring 83b, and a bottomed damper 83c). The piston 80, the positive pressure chamber 81, the back pressure chamber 82, and the elastic body 83 are located inside the cylinder 79. The piston 80 divides the interior of the cylinder 79 into the positive pressure chamber 81 and the back pressure chamber 82. The elastic body 83 biases the piston 80 in a direction reducing the capacity of the positive pressure chamber 81. Spring constants of the bottomed damper 83c, the second spring 83b, and the first spring 83a forming the elastic body 83 are larger in the order named. Interposed between the first spring 83a and the second spring 83b is a bottomed cylinder-like retainer member 84. The positive pressure chamber 81 is connected to the positive pressure fluid path 78a. The back pressure chamber 82 is connected to the back pressure port 67. When the back pressure chamber 82 has negative pressure, the back pressure chamber 82 comes into communication with the resupply port 66. When the brake fluid flows out of the secondary chamber 22S of the master cylinder 12, passes through the first secondary pipe 4S, the positive pressure pipe 42, and the positive pressure fluid path 78a, and enters the positive pressure chamber 81 according to the driver's braking operation, a pedal stroke is generated, and at the same time, the braking operation reaction force is developed by the biasing force of the elastic body 83.

The brake hydraulic circuit of the second hydraulic unit 3 is discussed below.

The second connection fluid path 54 is connected to the second input port 64 at one end. The other end of a second connection fluid path 54P diverges into a second connection fluid path 54c and a second connection fluid path 54d. The other end of a second connection fluid path 54S diverges into a second connection fluid path 54a and a second connection fluid path 54b. The second connection fluid paths 54a, 54b, 54c and 54d are connected to second output ports 65a, 65b, 65c and 65d, respectively. The second connection fluid path 54 is provided with the second cutoff valve 51. The second master cylinder hydraulic sensor 52 is disposed in the second connection fluid path 54S at a position closer to the second input port 64S than to a second cutoff valve 51S. The second master cylinder hydraulic sensor 52 detects the master cylinder hydraulic pressure when the first cutoff valve 29S is open. A bypass fluid path 85 is disposed in parallel with the second connection fluid path 54, bypassing the second cutoff valve 51. The bypass fluid path 85 is provided with a check valve 86. The check valve 86 allows the brake fluid to flow only in a direction from the second input port 64 side toward the second output port 65. The second connection fluid paths 54a, 54b, 54c and 54d are provided with the respective solenoid in valves 71. A bypass fluid path 87 is disposed in parallel with the second connection fluid path 54, bypassing the solenoid in valve 71. The bypass fluid path 87 is provided with a check valve 88. The check valve 88 allows the brake fluid to flow only in a direction from the second output port 65 side toward the second input port 64.

The second suction fluid path 55 is connected to the inner reservoir 63 at one end. The other end of the second suction fluid path 55 is connected to a second suction port 89 of the second pump 50. The second discharge fluid path 56 is connected to a second discharge port 90 of the second pump 50 at one end. The other end of the second discharge fluid path 56 diverges into a discharge fluid path 56P of the P system and a discharge fluid path 56S of the S system. Each of the discharge fluid paths 56P and 56S is connected to the second connection fluid path 54 at a position closer to the second output port 65 than to the second cutoff valve 51. The discharge fluid paths 56P and 56S are provided with second connection valves (third and fourth connection valves) 70P and 70S. The second reflux fluid path 57 has one end connected to a connecting position between the second discharge fluid path 56 on one hand and the discharge fluid paths 56P and 56S on the other. The other end of the second reflux fluid path 57 is connected to the inner reservoir 63. The second reflux fluid path 57 is provided with the second pressure adjustment valve 69. The pressure reduction fluid path 58 has one end connected to the second connection fluid path 54 at a position closer to the second output port 65 than to the solenoid in valve 71. The other end of the pressure reduction fluid path 58 is connected to the second reflux fluid path 57. The pressure reduction fluid path 58 is provided with the solenoid out valve 72.

The resupply fluid path 59 is connected to the resupply port 66 at one end. The other end of the resupply fluid path 59 is connected to the second reflux fluid path 57 at a position closer to the inner reservoir 63 than to the second pressure adjustment valve 69. The back pressure fluid path 60 is connected to the back pressure port 67 at one end. The other end of the back pressure fluid path 60 is connected to a connecting position between one end of the first simulator fluid path 61 and one end of the second simulator fluid path 62. The other end of the first simulator fluid path 61 is connected to the second connection fluid path 54S at a position closer to the second output port 65S than to the second cutoff valve 51S and closer to the second input port 64S than to the solenoid in valves 71a and 71b. The first simulator fluid path 61 is provided with the stroke simulator in valve 73. A bypass fluid path 91 is disposed in parallel with the first simulator fluid path 61, bypassing the stroke simulator in valve 73. The bypass fluid path 91 is provided with a check valve 92. The check valve 92 allows the brake fluid to flow only in a direction from the back pressure fluid path 60 side toward the second connection fluid path 54S. The other end of the second simulator fluid path 62 is connected to the second reflux fluid path 57 at a position closer to the second pressure adjustment valve 69 than to a connecting position to the resupply fluid path 59. The second simulator fluid path 62 is provided with the stroke simulator out valve 74. A bypass fluid path 93 is disposed in parallel with the second simulator fluid path 62, bypassing the stroke simulator out valve 74. The bypass fluid path 93 is provided with a check valve 94. The check valve 94 allows the brake fluid to flow only in a direction from the second reflux fluid path 57 side toward the back pressure fluid path 60.

The following discussion refers to the behavior of the vehicle braking system BS when the driver carries out the braking operation.

When the driver carries out the braking operation, the first control unit 31A actuates the first cutoff valve 29 into a closed position to block a brake fluid circulation between the master cylinder 12 and the first hydraulic unit 2. The first control unit 31A or the second control unit 31B actuates the first pump 28 or the second pump 50 to implement proportional control on the first pressure adjustment valve 43 or the second pressure adjustment valve 69 so as to obtain target wheel cylinder hydraulic pressure corresponding to the pedal stroke amount. The target wheel cylinder hydraulic pressure is wheel cylinder hydraulic pressure for achieving a predetermined boosting ratio, that is, ideal relational characteristics between the pedal stroke amount and the driver's required hydraulic brake pressure (deceleration G required by the driver) on the basis of the pedal stroke amount. The second control unit 31B actuates the stroke simulator out valve 74 into an open position to enable the brake fluid to be discharged from the back pressure chamber 82 of the stroke simulator 76 to the second connection fluid path 54S, thereby operating the stroke simulator 76.

The foregoing behavior makes it possible to reduce the driver's brake operation force and yet achieve the deceleration G according to the driver's request. The pedal stroke is also ensured, which achieves desired pedal feel. If the stroke simulator out valve 74 becomes incapable of turning into the open position, the first control unit 31A actuates the stroke valve 45 into an open position to ensure the pedal stroke.

The Embodiment 1 aims to improve responsiveness of a total braking force acting between tires on the wheels on one hand and a road surface (hereinafter, referred to simply as the braking force on the wheels), that is, the braking force of the vehicle on the other especially when a rapid deceleration is required. The Embodiment 1 implements the following brake control.

The first control unit 31A and the second control unit 31B select either the front or rear wheels as precedential wheels in which the braking force is precedentially generated according to a condition of the vehicle when a rapid deceleration is required (the other wheels are referred to as non-precedential wheels). The first control unit 31A and the second control unit 31B output a command to generate the braking force precedentially in the precedential wheels to the first hydraulic unit 2 and the second hydraulic unit 3. The phrase "when a rapid deceleration is required" means, for example, a situation where the driver brakes suddenly, a situation where an automated emergency braking operation is performed when the vehicle detects some danger lying ahead and stops automatically, and other like situations. The sentence "the braking force is precedentially generated" means that the braking force of the precedential wheels is made to reach a largest generatable braking force earlier than the braking force of the non-precedential wheels. The first control unit 31A or the second control unit 31B selects as precedential wheels the front or rear wheels whichever enhance the responsiveness of the braking force of the vehicle when applied with the largest braking force at an early stage. Whether sudden braking is applied can be judged by whether the operation speed and amount of the brake pedal 8 both exceed a sudden-braking judgement threshold value.

The vehicle braking system BS of the Embodiment 1 is set so that the braking force of the front wheels FL and FR and the braking force of the rear wheels RL and RR reach the largest braking force substantially at the same time if the wheel cylinders W/C of the wheels FL, FR, RL and RR are pressurized by the first pump 28 and the second pump 50 with the P and S systems communicating with each other while the vehicle travels on a paved road or the like with a high adhesive friction (high μ road surface). According to the Embodiment 1, the wheel cylinders W/C of the front wheels FL and FR and the wheel cylinders W/C of the rear wheels RL and RR are separately pressurized with the P and S systems out of communication with each other so that the braking force of the precedential wheels reaches the largest braking force earlier than the braking force of the non-precedential wheels.

The following discussion explains the process of the braking control that is implemented when a rapid deceleration is required.

Figure 3:
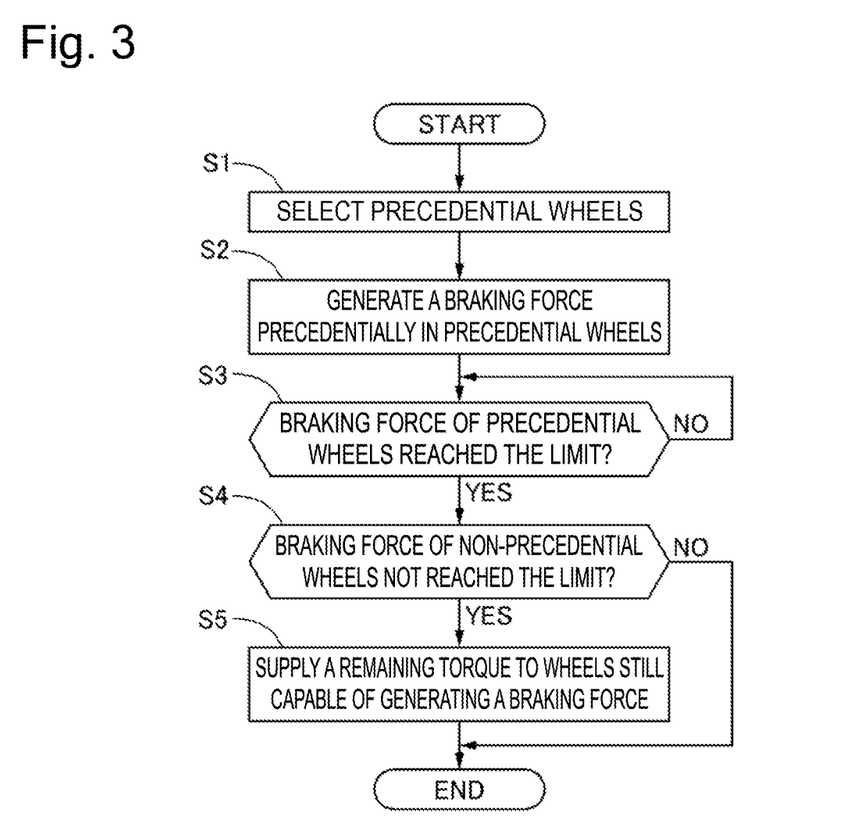
FIG. 3 is a flowchart showing a process of braking control that is implemented when a rapid deceleration is required according to the Embodiment 1.

FIG. 3 is a flowchart showing the process of the braking control that is implemented when a rapid deceleration is required according to the Embodiment 1.

Step S1 selects either the front wheels FL and FR or the rear wheels RL and RR as the precedential wheels according to the conditions of the vehicle. The "conditions of the vehicle" includes hydraulic rigidity of the wheel cylinders, a friction coefficient μ A between the tires and the road surface, the vehicle's traveling conditions (when the vehicle travels straight or makes a turn), an automobile rank, vehicle height, the number of occupants, vehicle attitude, and the like. The Embodiment 1 basically selects the front or rear wheels whichever are higher in hydraulic rigidity of the wheel cylinders W/C as the precedential wheels and whichever are lower in hydraulic rigidity of the wheel cylinders W/C as the non-precedential wheels.

Figure 4:
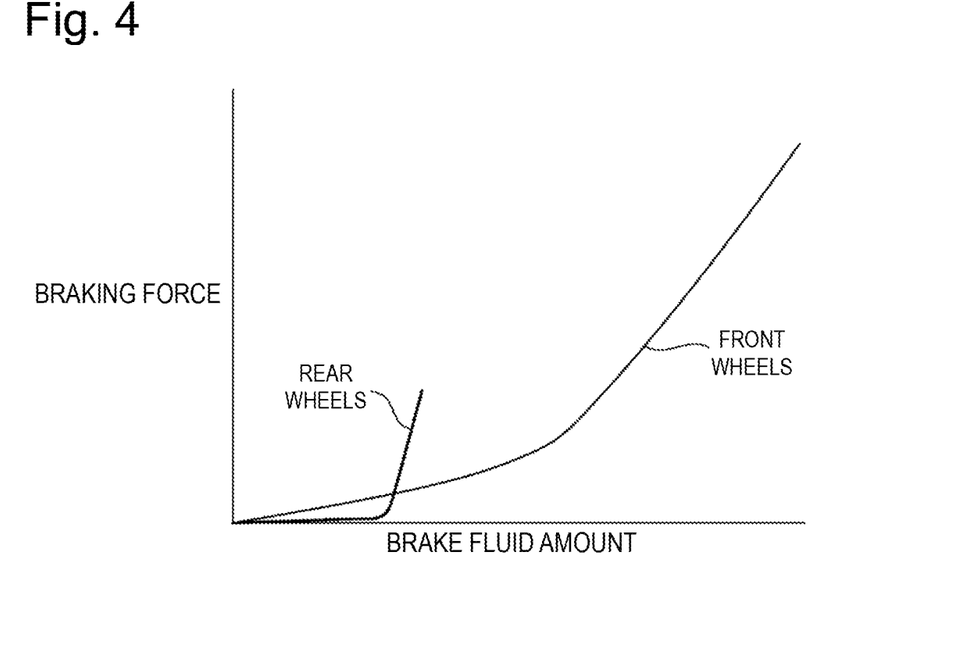
FIG. 4 is a time chart showing braking forces of front and rear wheels, which are generated by braking control when a rapid deceleration is required, according to the Embodiment 1.

FIG. 4 shows relationship between the brake fluid amount and the braking force in the wheel cylinders W/C of the Embodiment 1. As shown in FIG. 4, the wheel cylinders W/C (RL and RR) of the rear wheels RL and RR are higher in hydraulic rigidity than the wheel cylinders W/C (FL and FR) of the front wheels FL and FR. The phrase "high in hydraulic rigidity" means to have a small amount of consumption of the brake fluid for generating the braking torque. If the braking force is generated precedentially in the rear wheels RL and RR, the responsiveness of the braking force of the vehicle especially at an initial stage of braking is more improved, as compared to when the braking force is generated precedentially in the front wheels FL and FR. Step S1 therefore basically selects the rear wheels RL and RR as the precedential wheels. However, when the vehicle travels on a frozen road or the like with a low adhesive friction (low μ road surface) or on a curved road, Step S1 selects the front wheels FL and FR as the precedential wheels. This is because vehicle behavior might be disrupted if the braking force is generated precedentially in the rear wheels RL and RR on the low μ road surface or the curved road. In such a case, the stability of the vehicle behavior is prioritized over the responsiveness of the braking force of the vehicle, so that the front wheels FL and FR are selected as the precedential wheels. The friction coefficient μ can be estimated, for example, using a motion equation of the wheels mentioned below.

$$I\omega' = \mu WR - \tau B$$

where I is wheel inertia; ω' is wheel acceleration; W is wheel load; R is a rolling radius of a tire; and τB is braking torque.

If the friction coefficient µ is equal to or smaller than a predetermined value, it is determined that the vehicle travels on a low µ road surface.

Step S2 outputs a command to generate the braking force precedentially in the precedential wheels selected in Step S1 to the first hydraulic unit 2 and the second hydraulic unit 3. Specific details of the command are as below. (1) When the precedential wheels are the rear wheels RL and RR, the first cutoff valve 29 is actuated into the closed position, and the stroke simulator out valve 74 is actuated into the open position. The first connection valve 44P of the P system is actuated into an open position. The second cutoff valve 51S of the S system is actuated into a closed position. The second connection valve 70S of the S system is actuated into an open position. The first motor 27 is actuated at predetermined rotation frequency (or at highest rotation frequency), and the first pressure adjustment valve 43 is subjected to proportional control to increase the wheel cylinder hydraulic pressure of the front wheels FL and FR. The second motor 49 is actuated at predetermined rotation frequency (or at highest rotation frequency), and the second pressure adjustment valve 69 is subjected to proportional control to increase the wheel cylinder hydraulic pressure of the rear wheels RL and RR.

(2) When the precedential wheels are the front wheels FL and FR, the first cutoff valve 29 is actuated into the closed position, and the stroke simulator out valve 74 is actuated into the open position. The first connection valve 44S of the S system is actuated into an open position. The second cutoff valve 51P of the P system is actuated into a closed position. The second connection valve 70P of the P system is actuated into an open position. The first motor 27 is actuated at the predetermined rotation frequency (or at the highest rotation frequency), and the first pressure adjustment valve 43 is subjected to proportional control to increase the wheel cylinder hydraulic pressure of the rear wheels RL and RR. The second motor 49 is actuated at the predetermined rotation frequency (or at the highest rotation frequency), and the second pressure adjustment valve 69 is subjected to proportional control to increase the wheel cylinder hydraulic pressure of the front wheels FL and FR.

When the second pump 50 is equivalent to the first pump 28 in terms of ability of discharging the brake fluid or when the front wheels are selected as the precedential wheels in Embodiment 2 discussed later, Step S2 may command as below. The first cutoff valves 29 or only the first cutoff valve 29P is actuated into the closed position, and the stroke simulator out valves 74 are actuated into the open position. The first connection valve 44P of the P system is actuated into the open position. The second connection valve 70P of the P system is actuated into the open position. The first motor 27 is actuated at the predetermined rotation frequency (or at the highest rotation frequency), and the first pressure adjustment valve 43 is subjected to proportional control to increase the wheel cylinder hydraulic pressure of the front wheels FL and FR. The second motor 49 is actuated at the predetermined rotation frequency (or at the highest rotation frequency), and the second pressure adjustment valve 69 is subjected to proportional control to increase the wheel cylinder hydraulic pressure of the front wheels FL and FR.

In Step S3, a determination is made whether the braking force of the precedential wheels reaches a limit (largest braking force). If YES, the process moves to Step S4. If NO, the process repeats Step S3.

The largest generatable braking force can be estimated from the friction coefficient µ, the wheel load W, and a lateral force Fy. The lateral force FyF of the front wheels FL and FR and the lateral force FyR of the rear wheels RL and RR can be estimated, for example, using the following equations.

$$mGy = FyF + FyR$$

$$I\gamma' = FyF \times Lf + FyR \times Lr$$

where m is vehicle weight; Gy is lateral acceleration; $\gamma'$ is a yaw rate differential value; Lf is distance between a front axle and a vehicle's center of gravity; and Lr is distance between a rear axle and the vehicle's center of gravity.

The wheel load (steady-state value) W at deceleration in a case where the precedential wheels are the rear wheels RL and RR can be estimated from the friction coefficient µ, for example, using the following equation.

$$W = mg(Lf - H\mu)/L$$

where g is gravitational acceleration; H is height of gravity center; and L is wheel base.

The wheel load (steady-state value) W of the front wheels FL and FR at deceleration in a case where the precedential wheels are the front wheels FL and FR can be estimated from the friction coefficient µ, for example, using the following equation.

$$W = mg(Lr - H\mu)/L$$

The braking force of the precedential wheels can be estimated from the friction coefficient µ and a slip rate S as long as relationship between the slip rate S determined by the friction coefficient µ and the braking force is stored beforehand. The slip ratio S is a value obtained by dividing difference between vehicle body speed and the wheel speed by the vehicle body speed. The vehicle body speed is an average of the wheel speeds or the highest among the wheel speeds.

In Step S4, a determination is made whether the braking force of the non-precedential wheels does not reach a limit (largest braking force). If YES, the process moves to Step S5. If NO, the process ends the present control. A method of calculating the largest braking force and the braking force is the same as in Step S3 and therefore is not explained again.

Step S5 restrains the braking torque from being imparted to the precedential wheels and outputs a command to urge the braking torque to be imparted to the non-precedential wheels to the first hydraulic unit 2 and the second hydraulic unit 3. Specific details of the command are as below. (1) When the precedential wheels are the rear wheels RL and RR, the second connection valve 70P of the P system is actuated into the open position, and the second connection valve 70S of the S system is actuated into the closed position. (2) When the precedential wheels are the front wheels FL and FR, the second connection valve 70S of the S system is actuated into the open position, and the second connection valve 70P of the P system is actuated into a closed position.

The processing of Step S5 is repeated until the braking force of the non-precedential wheels reaches the limit or until the vehicle deceleration G reaches the driver's required deceleration G according to the pedal stroke.

Operation and advantageous effects of the Embodiment 1 are now discussed.

Figure 5:
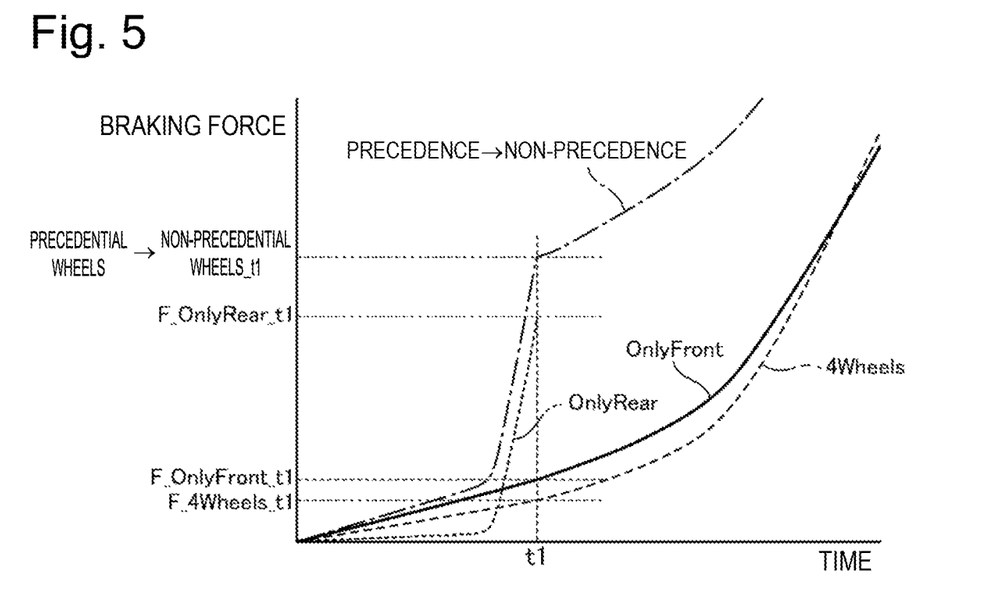
FIG. 5 is a time chart showing an improvement in responsiveness of the braking force generated by the braking control when a rapid deceleration is required according to the Embodiment 1.

FIG. 5 is a time chart showing the braking forces of front and rear wheels, which are generated by the braking control when a rapid deceleration is required, according to the Embodiment 1. FIG. 5 shows by a broken line (4Wheels) the braking force generated when the first pump 28 and the second pump 50 are actuated with the P and S systems communicating with each other as a comparative example of the Embodiment 1. A dotted line (Only Rear) shows a case where the braking force is generated only in the rear wheels RL and RR. A solid line (Only Front) shows a case where the braking force is generated only in the front wheels FL and FR. A chain line (precedence→non-precedence) shows a time chart of the Embodiment 1. According to the Embodiment 1, when the sudden braking applied by the driver is detected, the first control unit 31A and the second control unit 31B select the rear wheels RL and RR as the precedential wheels and generate the braking force precedentially in the rear wheels RL and RR. Specifically, the first control unit 31A and the second control unit 31B block a brake fluid circulation between the P system and the S system, impart the braking torque to the rear wheels RL and RR which are the precedential wheels using the brake fluid discharged from the second pump 50, and impart the braking torque to the front wheels FL and FR which are the non-precedential wheels using the brake fluid discharged from the first pump 28. The rear wheels RL and RR are higher than the front wheels FL and FR in hydraulic rigidity of the wheel cylinders W/C. Therefore, if the braking force is generated precedentially in the rear wheels RL and RR, the braking force of the vehicle at the initial stage of braking can be developed earlier than in the comparative example or a case where the braking force is generated precedentially in the front wheels FL and FR. The vehicle braking system BS of the Embodiment 1 therefore improves the responsiveness of the braking force of the vehicle when the sudden braking is required without relying on hardware specifications including a pumping ability and the like and also without changing a configuration of a conventional hydraulic unit which pressurizes the wheel cylinders to impart the braking torque to the wheels.

Provided with the two pumps (first and second pumps 28 and 50), the vehicle braking system BS of the Embodiment 1 pressurizes the wheel cylinders W/C (RL and RR) of the rear wheels RL and RR using the second pump 50 and simultaneously pressurizes the wheel cylinders W/C (FL and FR) of the front wheels FR and FL using the first pump 28. This eliminates delays in development of the braking force of the front wheels FL and FR, which is caused by not generating the braking force in the front wheels FL and FR until the braking force of the rear wheels RL and RR reaches the largest braking force, thereby preventing a degradation in responsiveness of the braking force of the vehicle.

The second pump 50 configured to pressurize the wheel cylinders W/C (RL and RR) of the rear wheels RL and RR is higher than the first pump 28 in ability of discharging the brake fluid. This enables the braking force of the rear wheels RL and RR to reach the largest braking force earlier than in a case where the discharging ability of the second pump 50 is equal to or lower than that of the first pump 28.

Referring to FIG. 5, when the braking force of the rear wheels RL and RR reaches the largest braking force at time t1, the first control unit 31A and the second control unit 31B stop imparting the braking torque to the rear wheels RL and RR and urge the braking torque to be imparted to the front wheels FL and FR using the brake fluid discharged from the first pump 28 and the second pump 50. Specifically, a connection destination of the second pump 50 is switched from the S system to the P system. When the braking force of the rear wheels RL and RR is in a saturated state, further pressurization of the wheel cylinders W/C (RL and RR) of the rear wheels RL and RR does not contribute to increase of the braking force and uselessly consumes the brake fluid. When the braking force of the rear wheels RL and RR is in the saturated state, therefore, the brake fluid discharged from the second pump 50 is provided to the wheel cylinders W/C (FL and FR) of the front wheels FL and FR to pressurize the wheel cylinders W/C (FL and FR). By so doing, the braking force of the front wheels FL and FR can reach the largest braking force earlier than when the wheel cylinders W/C (FL and FR) are pressurized simply by the brake fluid discharged from the first pump 28. Consequently, the responsiveness of the braking force of the vehicle can be further improved.

In FIG. 5, "F_4Wheels_t1×4" means a braking force at the time t1 in a case where the braking force is generated in the four wheels; "F_OnlyFront_t1×2" means a braking force at the time t1 in a case where the braking force is generated only in the front wheels FL and FR; and "F_OnlyRear_t1×2" means a braking force at the time t1 in a case where the braking force is generated only in the rear wheels RL and RR. "×4" and "×2" respectively mean four wheels and two wheels.

The vehicle braking system BS includes the first connection fluid paths (4P, 32P, 6P, 54P, 54a, 54b, 7FL and 7FR) connected to the wheel cylinders W/C (FL and FR) which impart the braking torque to the front wheels FL and FR; the second connection fluid paths (4S, 32S, 6S, 54S, 54c, 54d, 7RL and 7RR) connected to the wheel cylinders W/C (RL and RR) which impart the braking torque to the rear wheels RL and RR; the first communication fluid paths 34P and 34S connecting the first connection fluid paths and the second connection fluid paths; the first connection valves 44P and 44S disposed in the first communication fluid paths 34P and 34S, respectively; the first discharge fluid path 34 connected to the first communication fluid paths 34P and 34S extending between the first connection valve 44P and the first connection valve 44S; the first pump 28 connected to the first discharge fluid path 34; the second communication fluid paths 56P and 56S connecting the first connection fluid paths and the second connection fluid paths; the second connection valves 70P and 70S disposed in the second communication fluid paths 56P and 56S, respectively; the second discharge fluid path 56 connecting the second communication fluid paths 56P and 56S extending between the second connection valve 70P and the second connection valve 70S; and the second pump 50 connected to the second discharge fluid path 56. The foregoing configuration makes it possible to achieve the braking control that maximizes the braking force of the non-precedential wheels after the braking force is generated precedentially in the front or rear wheels whichever are selected as the precedential wheels, and the braking force of the precedential wheels becomes the largest braking force.

Embodiment 2

As Embodiment 2 is basically configured in a similar manner to the Embodiment 1, the following discussion merely explains differences from the Embodiment 1. The Embodiment 2 differs from the Embodiment 1 in the processing of Step S1 of the flowchart shown in FIG. 3.

In Step S1, precedential wheels are selected on the basis of an automobile rank, vehicle height, and other like factors, in addition to hydraulic rigidity of wheel cylinders W/C. Specifically, if the vehicle is a short wheel-base vehicle whose wheel base is equal to or smaller than a predetermined value or a front-heavy minivan or van whose vehicle height is equal to or larger than a predetermined value, front wheels FL and FR are selected as precedential wheels, regardless of the hydraulic rigidity of the wheel cylinders W/C. If the vehicle is a long wheel-base vehicle whose wheel base is larger than the predetermined value or a sedan whose vehicle height is smaller than the predetermined value, the front or rear wheels whichever are higher in hydraulic rigidity of the wheel cylinders W/C are selected as the precedential wheels.

The short wheel-base vehicle is larger in load shift than the long wheel-base vehicle at the same deceleration G, and rear wheels RL and RR of the short wheel-base vehicle are lifted when braking is applied. Therefore, even if wheel cylinder hydraulic pressure of the rear wheels RL and RR is increased at an early stage, this does not contribute to the generation of the braking force. In the vehicle of this type, the wheel cylinder hydraulic pressure of the rear wheels RL and RR is immediately reduced, so that the responsiveness of total braking force of the four wheels can be improved by generating the braking force precedentially in the front wheels FL and FR.

Idealistically, the wheel load on the wheels FL, FR, RL and RR is approximately static ±α during a time period from the beginning of the braking to the development of the braking force of the front wheels FL and FR, so that the rear wheels RL and RR may be selected as the precedential wheels in view of stability of the vehicle's behavior rather than considering the braking force. Realistically speaking, however, in some vehicles, a slip of the rear wheels RL and RR progresses once the front wheels FL and FR start being loaded, and a grip does not recover. Therefore, in light of reducing a delay in responsiveness of the total braking force of the four wheels, it is desirable that the front wheels FL and FR be selected as the precedential wheels.

Other Embodiments

The embodiments of the invention have been described with reference to several examples. The embodiments of the invention are presented to facilitate the understanding of the invention and do not limit the invention. The invention may be modified or improved without deviating from the gist thereof. The invention includes equivalents thereof. The constituent elements mentioned in the claims and description may be combined in any ways or omitted within a scope where the problem can be at least partially solved or a scope where the advantages are at least partially provided.

The selection of the wheels in which the braking force is precedentially generated may be made by a high-order controller of the first and second control units. The first and second control units may be configured as a single controller.

The friction coefficient μ may be estimated from relationship between steering torque and a road surface reaction force or from vehicle body acceleration/deceleration G. In the latter case, although the friction coefficient μ with respect to each wheel cannot be estimated, an average friction coefficient μ of the four wheels can be estimated.

The lateral force of the tires, the wheel load on the wheels, and the braking force applied to the wheels may be estimated using other publicly-known methods as necessary.

After the wheel cylinders of the precedential wheels are pressurized by two pumps, and the braking force of the precedential wheels reaches the predetermined value, the wheel cylinders of the non-precedential wheels may be pressurized by the two pumps.

When the braking force is generated precedentially in the precedential wheels, the braking force of the precedential wheels may be brought to a predetermined value smaller than the largest braking force.

The invention may utilize one pump. In this case, for example, after the braking force of the precedential wheels reaches the predetermined value, the wheel cylinders of the non-precedential wheels start being pressurized.

The first braking torque imparting portion and the second braking torque imparting portion, which are configured to impart the braking torque to the first wheel portion and the second wheel portion do not necessarily have to be wheel cylinders.

The following discussion refers to other modes of the invention which should be understood from the above-described embodiments.

The vehicle braking apparatus according to one mode includes a braking torque generating mechanism configured to generate a braking torque in a first braking torque imparting portion that imparts a braking torque to a first wheel portion that comprises either front or rear wheels of a vehicle and a second braking torque imparting portion that imparts a braking torque to a second wheel portion that comprises the other ones of the front and rear wheels, and a control mechanism configured to output to the braking torque generating mechanism a command for generating the braking force precedentially in the second wheel portion that is selected according to a condition of a vehicle as a wheel portion in which the braking force should be precedentially generated.

In another mode according to the foregoing mode, the control mechanism outputs to the braking torque generating mechanism a command for restraining the braking torque from being imparted to the second wheel portion and urging the braking torque to be imparted to the first wheel portion when a braking force of the second wheel portion reaches a predetermined value.

In another mode according to either one of the foregoing modes, the second wheel portion is the rear wheels.

In still another mode according to any one of the foregoing modes, the second wheel portion is the front wheels.

In still another mode according to any one of the foregoing modes, the first braking torque imparting portion and the second braking torque imparting portion are a first wheel cylinder and a second wheel cylinder, respectively, configured to be supplied with brake fluid to generate the braking torque.

In still another mode according to any one of the foregoing modes, the second wheel cylinder is higher in hydraulic rigidity than the first wheel cylinder.

In still another mode according to any one of the foregoing modes, the second wheel portion is the rear wheels.

In still another mode according to any one of the foregoing modes, the control mechanism outputs to the braking torque generating mechanism a command for restraining the brake fluid from being supplied to the second wheel cylinder and urging the brake fluid to be supplied to the first wheel cylinder when the braking force of the second wheel portion reaches the predetermined value.

In still another mode according to any one of the foregoing modes, the braking torque generating mechanism comprises a first connection fluid path connected to the first wheel cylinder; a second connection fluid path connected to the second wheel cylinder; a first hydraulic source connected to a first discharge fluid path connected to the first connection fluid path and the second connection fluid path; and a second hydraulic source connected to a second discharge fluid path connected to the first connection fluid path and the second connection fluid path. The control mechanism outputs to the braking torque generating mechanism a command for supplying the brake fluid to the second wheel cylinder using the second hydraulic source before the braking force of the second wheel portion reaches a predetermined value, and outputs to the braking torque generating mechanism a command for supplying the brake fluid to the first wheel cylinder using the first hydraulic source and the second hydraulic source after the braking force of the second wheel portion reaches the predetermined value.

In still another mode according to any one of the foregoing modes, the second hydraulic source is higher than the first hydraulic source in ability of discharging the brake fluid.

In still another mode according to any one of the foregoing modes, the braking torque generating mechanism includes a first braking torque generating source capable of generating the braking torque in the first braking torque imparting portion and/or the second braking torque imparting portion, and a second braking torque generating source capable of generating the braking torque in the first braking torque imparting portion and/or the second braking torque imparting portion.

In another view, the vehicle braking apparatus according to one mode includes a first connection fluid path connected to a first wheel cylinder configured to impart a braking torque to a front wheel portion of a vehicle; a second connection fluid path connected to a second wheel cylinder configured to impart a braking torque to a rear wheel portion of the vehicle; a first communication fluid path connecting the first connection fluid path and the second connection fluid path; a first connection valve disposed in the first communication fluid path; a second connection valve disposed in the first communication fluid path; a first discharge fluid path connected to a portion of the first communication fluid path, which is located between the first connection valve and the second connection valve; a first hydraulic source connected to the first discharge fluid path; a second communication fluid path connecting the first connection fluid path and the second connection fluid path; a third connection valve disposed in the second communication fluid path; a fourth connection valve disposed in the second communication fluid path; a second discharge fluid path connected to a portion of the second communication fluid path, which is located between the third connection valve and the fourth connection valve; and a second hydraulic source connected to the second discharge fluid path.

In another view, the vehicle braking method according to one mode selects a second wheel portion according to a condition of a vehicle as a wheel portion in which a braking force should be precedentially generated, when a braking torque generating mechanism generates a braking torque in a first braking torque imparting portion configured to impart a braking torque in a first wheel portion that comprises either front or rear wheels of the vehicle and a second braking torque imparting portion configured to impart a braking torque in the second wheel portion that comprises the other ones of the front and rear wheels, and outputs to the braking torque generating mechanism a command for generating the braking force precedentially in the second wheel portion that is selected.

In another mode according to the foregoing mode, when the braking force of the second wheel portion reaches a predetermined value, the braking torque is restrained from being imparted to the second wheel portion, and a command to urge the braking torque to be imparted to the first wheel portion is outputted to the braking torque generating mechanism.

In another mode according to either one of the foregoing modes, the first wheel portion is the front wheels, and the second wheel portion is the rear wheels. The first braking torque imparting portion and the second braking torque imparting portion are a first wheel cylinder and a second wheel cylinder, respectively, configured to be supplied with brake fluid to generate the braking torque. The second wheel cylinder is higher in hydraulic rigidity than the first wheel cylinder.

In still another view, the vehicle braking system includes a first braking torque generating unit configured to generate a braking torque in a first braking torque imparting portion that imparts a braking torque to a first wheel portion that comprises either front or rear wheels of a vehicle and a second braking torque imparting portion that imparts a braking torque to a second wheel portion that comprises the other ones of the front and rear wheels; a second braking torque generating unit configured to generate the braking torque in the first braking torque imparting portion and the second braking torque imparting portion; a first control unit configured to output to the first braking torque generating unit a command for generating the braking torque precedentially in the second wheel portion selected according to a condition of the vehicle as a wheel portion in which a braking force should be precedentially generated; and a second control unit configured to output to the second braking torque generating unit a command for generating the braking torque precedentially in the second wheel portion selected according to the condition of the vehicle as a wheel portion in which the braking force should be precedentially generated.

In another mode according to the foregoing mode, the second control unit outputs a command for imparting the braking torque to the second braking torque imparting portion before the braking force of the second wheel portion reaches a predetermined value, and outputs a command for imparting the braking torque to the first braking torque imparting portion after the braking force of the second wheel portion reaches the predetermined value.

In another mode according to either one of the foregoing modes, the first braking torque imparting portion and the second braking torque imparting portion are a first wheel cylinder and a second wheel cylinder, respectively, configured to be supplied with brake fluid to generate a braking torque.

In still another mode according to any one of the foregoing modes, the first wheel portion is the front wheels, and the second wheel portion is the rear wheels. The second wheel cylinder is higher in hydraulic rigidity than the first wheel cylinder.

In still another mode according to any one of the foregoing modes, the first braking torque generating unit is a first hydraulic unit including a first hydraulic source, and the second braking torque generating unit is a second hydraulic unit including a second hydraulic source that is higher than the first hydraulic source in ability of discharging the brake fluid.

The present application claims priority under Japanese Patent Application No. 2017-141451 filed on Jul. 21, 2017. The entire disclosure of Japanese Patent Application No. 2017-141451 filed on Jul. 21, 2017 including the description, claims, drawings and abstract, is incorporated herein by reference in its entirety.

REFERENCE SIGN LIST

4P: primary pipe (connection fluid path)
4S: secondary pipe (connection fluid path)
6P: primary pipe (connection fluid path)

6S: secondary pipe (connection fluid path)
7FL, 7FR: wheel cylinder pipe (connection fluid path)
7RL, 7RR: wheel cylinder pipe (connection fluid path)
28: first pump (hydraulic source)
32P: first connection fluid path (connection fluid path)
32S: second connection fluid path (connection fluid path)
34: first discharge fluid path
34P, 34S: first communication fluid path
44P: first connection valve
44S: first connection valve
50: second pump (hydraulic source)
54P: connection fluid path
54S: connection fluid path
54a-54d: connection fluid path
56: second discharge fluid path
56P: second communication fluid path
56S: second communication fluid path
70P: second connection valve
70S: second connection valve
BCU: brake control unit (control mechanism)
BS: vehicle braking system
BU (FL, FR): brake actuation unit (braking torque imparting portion)
BU (RL, RR): brake actuation unit (braking torque imparting portion)
FL, FR: front wheel (wheel portion)
RL, RR: rear wheel (wheel portion)
HU: hydraulic unit (braking torque generating mechanism)
W/C (FL, FR): wheel cylinder
W/C (RL, RR): wheel cylinder

The invention claimed is:

1. A vehicle braking apparatus comprising:
a braking torque generating mechanism configured to generate a braking torque in a first braking torque imparting portion that imparts a braking torque to a first wheel portion comprising either front or rear wheels of a vehicle and a second braking torque imparting portion that imparts a braking torque to a second wheel portion comprising the other ones of the front and rear wheels, and
a control mechanism configured to output to the braking torque generating mechanism a command for generating a braking force precedentially in the second wheel portion that is selected according to a condition of a vehicle as a wheel portion in which the braking force should be precedentially generated,
wherein the first braking torque imparting portion and the second braking torque imparting portion are a first wheel cylinder and a second wheel cylinder, respectively, configured to be supplied with brake fluid to generate the braking torque,
wherein the second wheel cylinder is higher in hydraulic rigidity than the first wheel cylinder, and
wherein when the braking force of the second wheel portion reaches a predetermined value, the control mechanism outputs to the braking torque generating mechanism a command for restraining the brake fluid from being supplied to the second wheel cylinder and urging the brake fluid to be supplied to the first wheel cylinder.

2. The vehicle braking apparatus described in claim 1, wherein the control mechanism outputs to the braking torque generating mechanism a command for restraining the braking torque from being imparted to the second wheel portion and urging the braking torque to be imparted to the first wheel portion when the braking force of the second wheel portion reaches a predetermined value.

3. The vehicle braking apparatus described in claim 1, wherein the second wheel portion is the rear wheels.

4. The vehicle braking apparatus described in claim 1, wherein the second wheel portion is the front wheels.

5. The vehicle braking apparatus described in claim 1, wherein the braking torque generating mechanism comprises a first braking torque generating source capable of generating the braking torque in the first braking torque imparting portion and/or the second braking torque imparting portion, and a second braking torque generating source capable of generating the braking torque in the first braking torque imparting portion and/or the second braking torque imparting portion.

6. A vehicle braking system comprising:
a first braking torque generating unit configured to generate a braking torque in a first braking torque imparting portion that imparts a braking torque in a first wheel portion comprising either front or rear wheels of a vehicle and a second braking torque imparting portion that imparts a braking torque in a second wheel portion comprising the other ones of the front and rear wheels;
a second braking torque generating unit configured to generate the braking torque in the first braking torque imparting portion and the second braking torque imparting portion;
a first control unit configured to output to the first braking torque generating unit a command for generating the braking torque precedentially in the second wheel portion selected according to a condition of the vehicle as the wheel portion in which a braking force should be precedentially generated; and
a second control unit configured to output to the second braking torque generating unit a command for generating the braking torque precedentially in the second wheel portion selected according to the condition of the vehicle as a wheel portion in which the braking force should be precedentially generated,
wherein the second control unit is configured to:
output a command for imparting the braking torque to the second braking torque imparting portion before the braking force of the second wheel portion reaches a predetermined value, and
output a command for imparting the braking torque to the first braking torque imparting portion after the braking force of the second wheel portion reaches the predetermined value,
wherein the first braking torque imparting portion and the second braking torque imparting portion are a first wheel cylinder and a second wheel cylinder, respectively, configured to be supplied with brake fluid to generate the braking torque,
wherein the first wheel portion is the front wheels; the second wheel portion is the rear wheels; and the second wheel cylinder is higher in hydraulic rigidity than the first wheel cylinder,
wherein the first braking torque generating unit is a first hydraulic unit including a first hydraulic source; and
wherein the second braking torque generating unit is a second hydraulic unit including a second hydraulic source that is higher than the first hydraulic source in ability of discharging the brake fluid.

7. A vehicle braking apparatus comprising:
a braking torque generating mechanism configured to generate a braking torque in a first braking torque imparting portion that imparts a braking torque to a first wheel portion comprising either front or rear wheels of a vehicle and a second braking torque imparting portion that imparts a braking torque to a second wheel portion comprising the other ones of the front and rear wheels, and a control mechanism configured to output to the braking torque generating mechanism a command for generating a braking force precedentially in the second wheel portion that is selected according to a condition of a vehicle as a wheel portion in which the braking force should be precedentially generated, wherein the first braking torque imparting portion and the second braking torque imparting portion are a first wheel cylinder and a second wheel cylinder, respectively, configured to be supplied with brake fluid to generate the braking torque, wherein the second wheel cylinder is higher in hydraulic rigidity than the first wheel cylinder wherein the second wheel portion is the rear wheels, wherein the braking torque generating mechanism comprises:

a first connection fluid path connected to the first wheel cylinder;

a second connection fluid path connected to the second wheel cylinder;

a first hydraulic source connected to a first discharge fluid path connected to the first connection fluid path and the second connection fluid path; and a second hydraulic source connected to a second discharge fluid path connected to the first connection fluid path and the second connection fluid path, and wherein the control mechanism is configured to:

output to the braking torque generating mechanism a command for supplying the brake fluid to the second wheel cylinder using the second hydraulic source before the braking force of the second wheel portion reaches a predetermined value, and output to the braking torque generating mechanism a command for supplying the brake fluid to the first wheel cylinder using the first hydraulic source and the second hydraulic source after the braking force of the second wheel portion reaches the predetermined value; and wherein the second hydraulic source is higher than the first hydraulic source in ability of discharging the brake fluid.

* * * * *